United States Patent (10) Patent No.: US 9,338,845 B2
Seider et al. (45) Date of Patent: May 10, 2016

(54) LED ARRANGEMENT

(71) Applicant: OSRAM GmbH, Munich (DE)

(72) Inventors: Andreas Seider, Schwindegg (DE); Harald Dellian, Soyen (DE)

(73) Assignee: OSRAM GmbH, Munich (DE)

( * ) Notice: Subject to any disclaimer, the term of this patent is extended or adjusted under 35 U.S.C. 154(b) by 216 days.

(21) Appl. No.: 14/101,422

(22) Filed: Dec. 10, 2013

(65) Prior Publication Data

US 2014/0191676 A1 Jul. 10, 2014

(30) Foreign Application Priority Data

Jan. 4, 2013 (DE) .................... 20 2013 000 064 U

(51) Int. Cl.
H05B 37/00 (2006.01)
H05B 39/00 (2006.01)
H05B 41/00 (2006.01)
H05B 33/08 (2006.01)

(52) U.S. Cl.
CPC .......... *H05B 33/0821* (2013.01); *H05B 33/083* (2013.01); *Y02B 20/383* (2013.01)

(58) Field of Classification Search
USPC ......................................... 315/193, 186, 313
See application file for complete search history.

(56) References Cited

U.S. PATENT DOCUMENTS

| 5,457,450 | A | * | 10/1995 | Deese | .................... | G08G 1/095 |
| | | | | | | 340/641 |
| 7,009,580 | B2 | * | 3/2006 | Leung | ................ | H05B 33/0842 |
| | | | | | | 340/912 |
| 7,265,496 | B2 | * | 9/2007 | Allen | ....................... | F21S 48/10 |
| | | | | | | 315/185 R |
| 7,439,944 | B2 | * | 10/2008 | Huynh | ............... | H05B 33/0818 |
| | | | | | | 315/185 S |
| 8,314,564 | B2 | * | 11/2012 | Yu | ....................... | H05B 33/0809 |
| | | | | | | 315/185 R |
| 8,410,711 | B2 | * | 4/2013 | Lin | .................... | H05B 33/0824 |
| | | | | | | 315/224 |
| 8,564,219 | B2 | * | 10/2013 | Lee | ................... | H05B 33/0812 |
| | | | | | | 315/209 R |
| 9,006,984 | B2 | * | 4/2015 | Akiyama | ........... | H05B 33/0821 |
| | | | | | | 315/119 |

(Continued)

FOREIGN PATENT DOCUMENTS

DE 102006033873 A1 1/2008
DE 102012207456 B4 11/2013

(Continued)

OTHER PUBLICATIONS

English language abstract of DE 102012207456 dated Nov. 28, 2013.

(Continued)

*Primary Examiner* — Adam Houston
(74) *Attorney, Agent, or Firm* — Viering, Jentschura & Partner mbB

(57) ABSTRACT

An LED arrangement includes a first LED chain having first LEDs; a second LED chain having second LEDs; a circuit arrangement for coupling the first and second LED chains to a supply source; wherein the circuit arrangement is configured such that the first and second LED chains can be coupled to or decoupled from the supply source, wherein the first LED chain can be coupled to the supply source at first points in time and the second LED chain can be coupled to the supply source at second points in time; wherein the circuit arrangement is configured such that, in the case of a coupling of the LED arrangement to the supply source, a current having a first average current intensity through the first LED chain and a current having a second average current intensity through the second LED chain, wherein the LEDs are arranged depending on their current intensities.

10 Claims, 8 Drawing Sheets

(56) References Cited

U.S. PATENT DOCUMENTS

| | | | | |
|---|---|---|---|---|
| 9,030,121 B2* | 5/2015 | Lin | H05B 33/0824 | 315/291 |
| 9,119,255 B2* | 8/2015 | Pijlman | H05B 33/0806 | |
| 2009/0174301 A1 | 7/2009 | Frey et al. | | |
| 2011/0227485 A1* | 9/2011 | Huynh | H05B 33/083 | 315/127 |
| 2012/0038284 A1* | 2/2012 | Setomoto | H05B 33/0827 | 315/192 |
| 2012/0081009 A1* | 4/2012 | Shteynberg | H05B 33/083 | 315/122 |
| 2012/0262075 A1* | 10/2012 | Lynch | H05B 33/0818 | 315/192 |
| 2013/0026925 A1* | 1/2013 | Ven | H05B 33/0824 | 315/122 |
| 2013/0069547 A1* | 3/2013 | van de Ven | H05B 33/0809 | 315/188 |
| 2014/0015428 A1* | 1/2014 | Tao | H05B 33/083 | 315/187 |
| 2014/0125238 A1* | 5/2014 | Kwon | H05B 33/0809 | 315/193 |
| 2014/0184080 A1* | 7/2014 | Rybicki | H05B 33/0845 | 315/122 |
| 2014/0191676 A1* | 7/2014 | Seider | H05B 33/0821 | 315/193 |
| 2014/0217908 A1* | 8/2014 | Chiang | H05B 33/083 | 315/186 |
| 2015/0023014 A1* | 1/2015 | Akai | F21V 7/04 | 362/235 |
| 2015/0108909 A1* | 4/2015 | Rupp | H05B 33/083 | 315/188 |
| 2015/0216003 A1* | 7/2015 | Chien | H05B 33/0824 | 315/201 |
| 2015/0230298 A1* | 8/2015 | Chu | H05B 33/083 | 315/186 |
| 2015/0245437 A1* | 8/2015 | Cho | H05B 33/083 | 315/186 |

FOREIGN PATENT DOCUMENTS

| | | |
|---|---|---|
| DE | 102012207457 A1 | 11/2013 |
| WO | 2010143362 A1 | 12/2010 |
| WO | 2011010774 A1 | 1/2011 |

OTHER PUBLICATIONS

English language abstract of DE 102012207457 A1 dated Nov. 7, 2013.

Office Action issued in the corresponding German application No. 202013000064.3, dated Sep. 12, 2013, 5 pages.

* cited by examiner

| x | n | $\bar{I}_n$ | M5 | M7 | M9 |
|---|---|---|---|---|---|
| 1 | 1 | 84 | 80.33 | 80.50 | 80.50 |
| 2 | 3 | 73 | 80.50 | 80.60 | 81.17 |
| 3 | 1 | 84 | 80.60 | 81.17 | 81.57 |
| 4 | 2 | 81 | 80.60 | 81.57 | 79.75 |
| 5 | 2 | 81 | 82.80 | 79.14 | 80.22 |
| 6 | 1 | 84 | 79.40 | 80.71 | 80.22 |
| 7 | 1 | 84 | 80.00 | 80.71 | 81.11 |
| 8 | 4 | 67 | 80.60 | 80.71 | 80.78 |
| 9 | 1 | 84 | 80.00 | 80.71 | 81.11 |
| 10 | 1 | 84 | 79.40 | 80.71 | 80.22 |
| 11 | 2 | 81 | 82.80 | 79.14 | 80.22 |
| 12 | 2 | 81 | 80.60 | 81.57 | 80.22 |
| 13 | 1 | 84 | 80.60 | 81.57 | 80.89 |
| 14 | 3 | 73 | 81.20 | 80.00 | 80.89 |
| 15 | 1 | 84 | 79.60 | 80.43 | 80.56 |

| x | n | $\overline{\text{In}}$ | M5 | M7 | M9 |
|---|---|---|---|---|---|
| 1 | 1 | 84 | 79.33 | 80.50 | 80.50 |
| 2 | 2 | 81 | 80.50 | 81.20 | 81.17 |
| 3 | 3 | 73 | 81.20 | 81.17 | 81.57 |
| 4 | 1 | 84 | 80.60 | 81.57 | 79.75 |
| 5 | 1 | 84 | 81.20 | 79.14 | 80.22 |
| 6 | 2 | 81 | 80.00 | 79.57 | 79.89 |
| 7 | 1 | 84 | 80.00 | 80.71 | 80.22 |
| 8 | 4 | 67 | 79.40 | 80.71 | 81.44 |
| 9 | 1 | 84 | 80.00 | 80.71 | 80.22 |
| 10 | 2 | 81 | 80.00 | 79.57 | 79.89 |
| 11 | 1 | 84 | 81.20 | 79.14 | 80.22 |
| 12 | 1 | 84 | 80.60 | 81.57 | 80.22 |
| 13 | 3 | 73 | 81.20 | 81.57 | 81.78 |
| 14 | 2 | 81 | 81.20 | 81.57 | 80.56 |
| 15 | 1 | 84 | 80.60 | 80.00 | 80.89 |

| x | n | In | M5 | M7 | M9 |
|---|---|---|---|---|---|
| 1 | 1 | 84 | 83.33 | 81.00 | 81.00 |
| 2 | 2 | 82 | 81.00 | 81.60 | 81.67 |
| 3 | 1 | 84 | 81.60 | 81.67 | 82.00 |
| 4 | 3 | 74 | 81.20 | 82.00 | 82.25 |
| 5 | 1 | 84 | 81.60 | 82.00 | 82.22 |
| 6 | 2 | 82 | 81.60 | 82.00 | 82.22 |
| 7 | 1 | 84 | 83.20 | 82.00 | 81.33 |

LED ARRANGEMENT

CROSS-REFERENCE TO RELATED APPLICATION

This application claims priority to German Patent Application Serial No. 20 2013 000 064.3, which was filed Jan. 4, 2013, and is incorporated herein by reference in its entirety.

TECHNICAL FIELD

Various embodiments relate generally to an LED arrangement.

BACKGROUND

Light emitting diode (LED) arrangements in which series-connected LEDs are operated directly from an AC voltage power supply system are known from the prior art. This leads to a strong light modulation of the LEDs, which can impair the appearance of such an LED arrangement. Furthermore, such operation of LEDs is very energy-inefficient.

SUMMARY

An LED arrangement includes a first LED chain having first LEDs; a second LED chain having second LEDs; a circuit arrangement for coupling the first and second LED chains to a supply source; wherein the circuit arrangement is configured such that the first and second LED chains can be coupled to or decoupled from the supply source, wherein the first LED chain can be coupled to the supply source at first points in time and the second LED chain can be coupled to the supply source at second points in time; wherein the circuit arrangement is configured such that, in the case of a coupling of the LED arrangement to the supply source, a current having a first average current intensity through the first LED chain and a current having a second average current intensity through the second LED chain, wherein the LEDs are arranged depending on their current intensities.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4a shows a tabular illustration of a first arrangement possibility of a linear LED arrangement including four LED chains for generating a homogeneous luminance in accordance with various embodiments;

FIG. 4b shows a graphical illustration of the values of the first arrangement possibility that are illustrated in a tabular manner in FIG. 4a;

FIG. 5a shows a tabular illustration of a second arrangement possibility of a linear LED arrangement including four LED chains for generating a homogeneous luminance in accordance with various embodiments;

FIG. 5b shows a graphical illustration of the values of the second arrangement possibility that are illustrated in a tabular manner in FIG. 5a;

FIG. 7b shows a graphical illustration of the values of the arrangement possibility that are illustrated in a tabular manner in FIG. 7a;

DESCRIPTION

Figure 1:
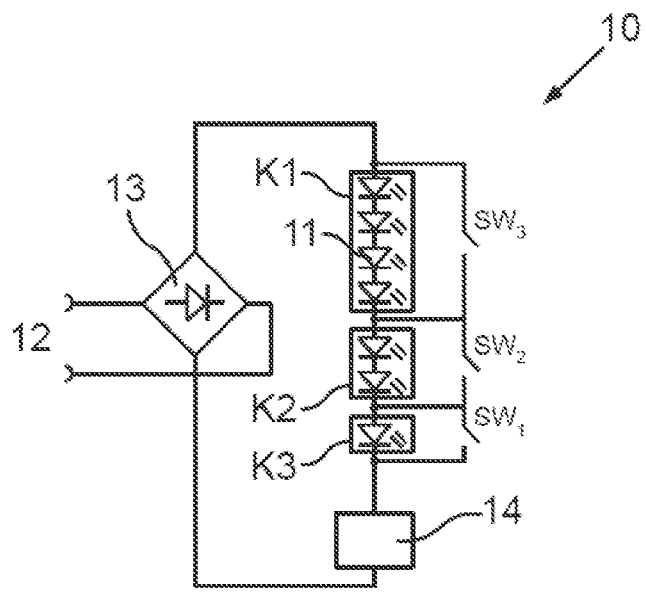
FIG. 1 shows a schematic illustration of a circuit arrangement for coupling LED chains to a supply source in accordance with various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide a light emitting diode (LED) arrangement which is as energy-efficient as possible and by means of which, at the same time, an impairment of the appearance of the LED arrangement can be avoided.

The LED arrangement according to various embodiments includes at least one first LED chain having a first plurality of series-connected LEDs, at least one second LED chain having a second plurality of series-connected LEDs, and a circuit arrangement, by means of which the first and second LED chains can be coupled to a supply source. Furthermore, the LEDs are arranged at least partly on at least one first arrangement surface. Furthermore, the circuit arrangement is configured in such a way that the first LED chain and second LED chain in each case can be coupled to a supply source and can be decoupled from the supply source, wherein the first LED chain can be coupled to the supply source at first points in time and the second LED chain can be coupled to the supply source at second points in time, wherein the first points in time differ from the second points in time. Furthermore, the circuit arrangement is configured in such a way that, in the case of a coupling of the LED arrangement to a supply source providing a temporally varying voltage, a current having a first average current intensity flows through the first LED chain and a current having a second average current intensity flows through the second LED chain, said second average current intensity differing from the first average current intensity at least owing to the difference between the first and second points in time. Furthermore, the LEDs of the at least one first and second LED chain are arranged according to a predefined criterion depending on their average current intensities.

In this case, the operation of the LEDs that is as energy-efficient as possible is made possible by the circuit arrangement, by means of which the LED chains can be coupled to a supply source at respectively different points in time. This affords the possibility of connecting and disconnecting the LED chains depending on a voltage level of the supply source, such as an in particular rectified sinusoidal power supply system voltage, for example, and thus of adapting the number of LEDs operated at a point in time to the input voltage available at said point in time.

In addition to this advantage of the great energy efficiency, this operation of the LEDs also has the advantage that light modulations, such as the "flicker" of the LEDs that usually arises in the case of LEDs operated directly from the AC voltage power supply system, are avoided since the LEDs can be operated at least partly over the majority of the period duration of the power supply system sine, by virtue of the fact that a few LEDs can already be operated for example at low voltage values which would not suffice for the operation of all the LEDs. The remaining LEDs can be connected as soon as the power supply system sine has reached the voltage level necessary for this.

This connection and disconnection of the LED chains, e.g. at different points in time, results in a different degree of utilization of the individual LED chains, however, whereby parts of the LED arrangement are energized to a lesser extent than other parts; in particular as a result different average current intensities can be registered in the individual LED chains, which can also bring about different luminances of the LEDs in the individual LED chains. In order that the optical appearance of such an LED arrangement is not impaired as a result, the invention furthermore provides for arranging the LEDs according to a predetermined criterion depending on their average current intensities. Taking account of the average current intensities in the arrangement of the LEDs on the arrangement surface or the arrangement surfaces makes it possible, in a particularly advantageous manner, to provide a very homogeneous luminance distribution over the entire arrangement or at least regionally.

In this regard, the effect of the different luminances of the individual LED chains can be compensated for in a particularly cost-effective and simple manner, without this having to be realized by measures which for example in terms of circuit technology involve a very high expenditure and are expensive, complex and involve a high material expenditure. Furthermore, in the case of the arrangement of the LEDs, a multiplicity of possibilities are available which enable a particularly homogeneous luminance to be achieved and which can be adapted to desired requirements, depending on the application.

In various embodiments, the predefined criterion in the case of the arrangement of the LEDs on the at least one first arrangement surface relates to a mixture of the LEDs of the at least one first and second LED chain. As a result of the mixture of the LEDs of the individual LED chains in the case of the arrangement, differences in luminance of the LEDs of the individual LED chains can be compensated for in a particularly simple manner In this case, the mixture can be configured in such a way that at least two of the LEDs of the at least one first LED chain are arranged in each case alongside at least one LED of the LEDs of the at least one second LED chain. A second LED arranged alongside a first LED or a second LED neighbouring a first LED can be defined in this case such that in a predefined angular range, such as, for example, less than 180°, that is to say in the interval [0°; 180°], as viewed from the first LED, the second LED has the smallest distance with respect to the first LED compared with the distances of the other LEDs with respect to the first LED in said angular range. In the case of a non-planar LED arrangement, the predefined angular range can also relate to a solid angle range, such as, for example, less than $2\pi$, that is to say in the interval [0; $2\pi$]. Furthermore, the predefined angular range can be defined symmetrically with respect to the connecting line between first and second LEDs.

It may also be advantageous to have an arrangement in which the LEDs of a respective LED chain are distributed as uniformly as possible over the arrangement surface or over the length of an arrangement region, such as, for example, in the case of a linear arrangement. For example in such a way that the number of LEDs of an LED chain per unit length or area is constant over the entire arrangement region of the arrangement surface. In this case, too, a multiplicity of configuration possibilities are available which can be adapted depending on the application.

By way of example, the arrangements of the LEDs on the arrangement surface or the arrangement surfaces can be adapted to the number of LEDs, e.g. of the individual LED chains, to the number of LED chains and/or the type of LEDs or else the desired geometry of the arrangement. This configuration of various embodiments thus makes it possible to provide, for a multiplicity of lighting purposes, particularly energy-efficient lighting having a particularly homogeneous luminance across the entire LED arrangement in a particularly cost-effective and simple manner In a further configuration of various embodiments, the LEDs are arranged linearly, such that each LED has in each case at most two neighboring LEDs. Linear LED arrangements may be advantageous for a multiplicity of lighting purposes. However, differences in luminance in individual regions of the arrangement would be particularly conspicuous precisely in the case of linear LED arrangements. Various embodiments for the first time makes it possible also to provide a particularly energy-efficient and cost-effective linear LED arrangement having at the same time a homogeneous luminance.

In a further configuration of various embodiments, the LEDs are arranged at a respective distance from one another, wherein the distances are dimensioned such that the distances from LEDs having a larger average current intensity to neighboring LEDs are on average greater than the average distances from the LEDs having smaller average current intensities to neighboring LEDs. In this regard, the distances between the individual LEDs can be set such that, for example, a desired value of the light intensity per unit length can be achieved. The variation of the distances furthermore also permits a multiplicity of further arrangement possibilities by which, for example, the homogeneity of the luminance distribution can be improved even further.

In a further configuration of various embodiments, the predefined criterion relates to a separation of the LEDs of the at least one first and second LED chain. This separation or a spatial separation of the LEDs of different LED chains in the case of the arrangement of the LEDs makes it possible to achieve a homogeneous luminance in the respective region in which the LEDs of an LED chain are arranged. This can furthermore be utilized in a very advantageous manner. By way of example, the different luminances thus present in the different arrangement regions can be utilized for obtaining a desired illuminance distribution of the LED arrangement. Therefore, it is not necessary here to compensate for the light differences of the LEDs of the individual LED chains, rather these light differences can be utilized in a targeted manner for specific lighting purposes. This also constitutes a particularly energy-efficient, cost-saving and elegant configuration of the LED arrangement according to various embodiments.

In a further configuration of various embodiments, the LED arrangement has at least one second arrangement surface, wherein the at least one first and second arrangement surface are arranged on at least one main body. In this case, the normal vectors of the at least one first arrangement surface differ in terms of their direction from the normal vectors of the at least one second arrangement surface, wherein an orientation of the normal vectors points away from the at least one main body. Furthermore, the separation is configured in such a way that the LEDs of the at least one first LED chain are arranged on the at least one first arrangement surface and the LEDs of the at least one second LED chain are arranged on the at least one second arrangement surface.

This constitutes a particularly advantageous geometrical arrangement of the LED chains according to their average current intensity since the different average current intensities of the individual LED chains that are brought about by the circuit arrangement and the different luminances resulting therefrom can thus be utilized for obtaining, for example, a desired illuminance distribution with different illuminances in different spatial directions. Furthermore, here as well a multiplicity of arrangement possibilities are available which enable a desired emission characteristic to be generated. In this case, the LED arrangement can also include more than two LED chains and/or also more than two arrangement surfaces. These can be arranged for example on one but also on a plurality of main bodies. Furthermore, a multiplicity of possibilities are also available concerning the geometrical configuration of the arrangement surfaces, and also the arrangement thereof with respect to one another. In this case, the main emission direction of the LEDs can be parallel to the normal vector of the arrangement surface in the regions in which the LEDs are respectively arranged. In various embodiments, the main emission direction of an LED can in this case be identical to an optical axis of the LED, an axis of symmetry of the LED and/or an axis of symmetry of the illuminance distribution of the LED. Furthermore, the LEDs can be arranged on a circuit board, such that the surface of the circuit board corresponds to the arrangement surface. This constitutes a particularly simple configuration possibility. In various embodiments, as a result a desired illuminance distribution can be realized in a very simple manner by a corresponding arrangement of the arrangement surfaces.

Furthermore, this configuration of various embodiments also makes it possible to achieve a great economic advantage since, e.g. during the production of products including such LED arrangements, significant savings in terms of material and development times can be achieved. This is because the possibility is afforded of realizing the production of different illuminances in different spatial directions solely by means of a suitable arrangement of the LEDs of respective LED chains having different average current intensities, without different LEDs having to be provided for this purpose.

In a further configuration of various embodiments, the first plurality of LEDs differs in terms of its number from the second plurality of LEDs. Here as well many configuration possibilities for the LED arrangement are thus available. Furthermore, as a result of provision of a plurality of LED chains having different numbers of LEDs, as a result of the connection and disconnection of the LED chains, the number of LEDs operated at a specific point in time can be adapted very well to the voltage present at this point in time, whereby energy-efficient operation of the LEDs can be increased even further. In various embodiments, the first LED chain can have twice as many LEDs as the second LED chain. In the case of an LED arrangement including more than two LED chains, it may be advantageous if the number of LEDs of respectively two LED chains differs by a factor in the range of 1.5 to 2.5, e.g. by a factor of 2. The LEDs can be operated particularly energy-efficiently as a result. In various embodiments, in the case of such a dimensioning of the number of LEDs of the respective LED chains, particularly few circuit-governed losses occur.

In a further configuration of various embodiments, the first and second arrangement surfaces are arranged with respect to one another in such a way that light which can be emitted by the LEDs arranged on the first arrangement surface can be emitted for the most part into a first solid angle range and light which can be emitted by the LEDs arranged on the second arrangement surface can be emitted for the most part into a second solid angle range, which differs from the first solid angle range. Different solid angle ranges can thus be illuminated to different extents in a particularly simple manner Here as well many possibilities for adaptation to a desired illuminance distribution are available with utilization of the different average current intensities of the individual LED chains. By way of example, it is possible to utilize the different luminances of the LED chains during the illumination of different solid angle ranges so as to generate direct and indirect lighting. The magnitude of the illuminated solid angle can furthermore likewise be adapted to a desired lighting to be generated, e.g. through suitable adaptation of the arrangement of the arrangement surfaces.

In a further configuration of various embodiments, the first and second arrangement surfaces are embodied as planar surfaces and are arranged oppositely on two sides of the at least one main body. This constitutes a particularly simple and cost-effective possibility for configuration of the LED arrangement according to various embodiments in which direct and indirect lighting are provided in a very advantageous manner by the opposite arrangement of the LEDs. In this case, the illuminances can again be adapted to specific requirements or a desired illuminance distribution. In various embodiments, these are determined by the average current intensities of the individual LED chains and can thus be suitably varied by means of the number of LED chains used or the number of LEDs in an LED chain.

In a further configuration of various embodiments, the at least one main body is embodied in a conical fashion with a base side and a lateral side and the first arrangement surface is arranged at the base side of the main body and the second arrangement surface is arranged at the lateral side of the main body. This configuration may be particularly well suited for example to use for an incandescent-lamp-like LED luminaire; the LEDs for generating direct lighting, said LEDs being arranged on the base side, can have a higher average current intensity than the LEDs for generating indirect lighting, said LEDs being arranged on the lateral side.

FIG. 1 shows a schematic illustration of a circuit arrangement 10 for coupling LED chains K1, K2 and K3 to a supply source 12 in accordance with various embodiments. In this case, by way of example, three LED chains K1, K2 and K3 are connected in series. In this case, the LED chains K1, K2 and K3 each have a different number of LEDs 11; in this example, the first LED chain K1 has four LEDs 11, the second LED chain K2 has two LEDs 11 and the third LED chain K3 has one LED 11. In various embodiments, it is provided for an LED chain K1, K2 and K3 to have $2^x n$ LEDs 11, wherein n is the number of LEDs 11 of the LED chain K3 having the smallest number of LEDs 11 and x is a natural number, that is to say in particular such that the number of LEDs 11 of respectively two LED chains K1, K2 and K3 differs by the factor 2. A switch SW1, SW2 and SW3 is arranged in parallel with each LED chain K1, K2 and K3, by means of which switch the corresponding LED chain K1, K2 and K3 can be coupled to the supply source 12 and can be decoupled from the supply source 12. In various embodiments, the closing of a switch SW1, SW2 or SW3 brings about the bridging of the LED chain K1, K2 and K3 arranged in parallel therewith. The supply source 12 can be a sinusoidal AC voltage source, for example, downstream of which a rectifier circuit 13 is connected.

In this case, the circuit arrangement 10 illustrated shows the basic schematic diagram of a circuit arrangement by means of which the individual LED chains K1, K2 and K3 can be connected and disconnected depending on the voltage level of the power supply system sine. Such a circuit arrangement 10 is described as a circuit for driving semiconductor lighting elements in the applications in the name of the same applicant and having the official file references DE102012207456.2, DE102012207457.0 and DE102012207454.6, the disclosure content of which is hereby incorporated within the full scope thereof by reference. In various embodiments, circuits in accordance with FIG. 1 to FIG. 7 of the application having the reference DE102012207456.2 can be provided as circuit arrangement 10 of the LED arrangement 20 (cf. e.g. FIG. 8).

A circuit arrangement 10 by means of which the individual LED chains K1, K2 and K3 can be connected and disconnected depending on the voltage level of the power supply system sine enables LEDs 11 to be operated very energy-efficiently since it is possible to utilize the majority of the voltage provided by the supply source 12 with respect to a period duration of an oscillation period of the power supply system sine. Furthermore, a current controller 14 can also be provided, which, by way of example, is connected in series with the LED chains K1, K2 and K3 and, in the simplest case, can also be embodied as a linear controller. Furthermore, capacitors (not illustrated) can also be provided, which can be connected in parallel with the LED chains K1, K2 and K3.

FIG. 2a to FIG. 2d show the temporal current profiles I1, I2, I3, and I4 of respectively one of four interconnected, e.g. series-connected, LED chains K1, K2, K3 and K4 (cf. FIG. 4a and FIG. 5a) of an LED arrangement 20 in accordance with various embodiments. These illustrations are intended to illustrate by way of example the coupling to and decoupling from the supply source 12 of the individual LED chains K1, K2, K3 and K4. Hereinafter, the first LED chain K1 shall have the most LEDs 11, the second LED chain K2 shall have fewer than the first, the third LED chain K3 fewer than the second, and the fourth LED chain K4 fewer than the third. In various embodiments, the numbers of LEDs 11 of respectively two LED chains K1, K2, K3 and K4 can differ by a factor in the range of 1.5 to 2.5, preferably by a factor of 2. Furthermore, the time period of 0 to 10 ms plotted on the x-axis in FIG. 2a to FIG. 2d corresponds to half a period duration of a sinusoidal AC voltage provided by a supply source 12.

Figure 2A:
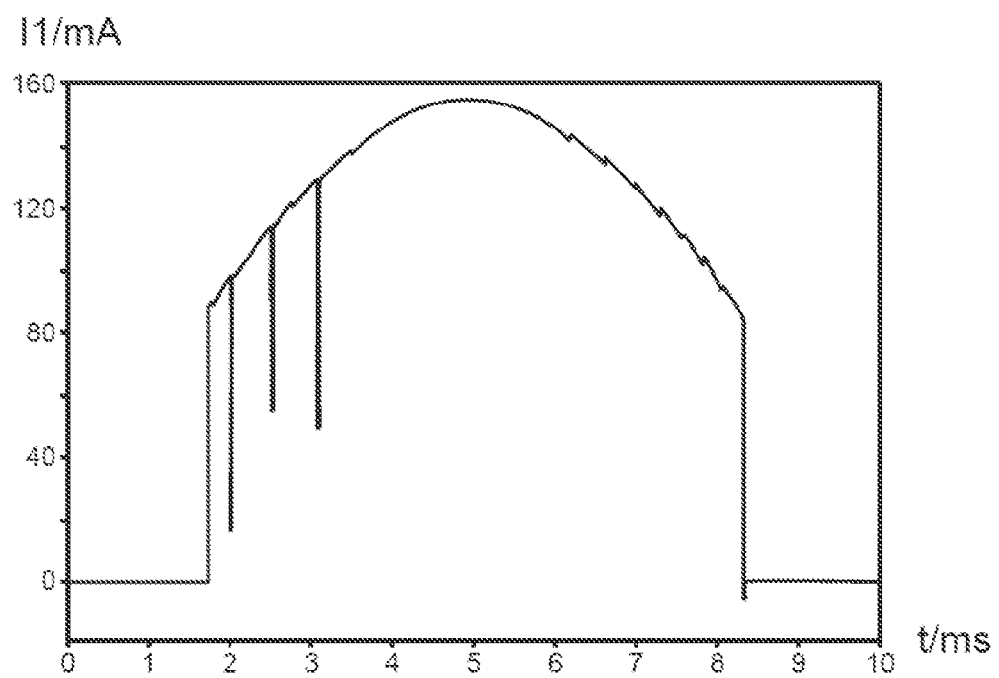
FIG. 2a shows a graphical illustration of the temporal current profile of a first LED chain of an LED arrangement in the case of coupling to and decoupling from a sinusoidal rectified AC voltage by means of a circuit arrangement designed therefor in accordance with various embodiments.

FIG. 2a shows the temporal current profile I1 of the first LED chain K1. When the voltage value of the power supply system sine reaches a specific limit value that is sufficient for the operation of the series-connected LEDs 11 of the first LED chain K1, the first LED chain K1 is coupled to the supply source 12, for example by the opening of a switch SW1 connected in parallel with the first LED chain K1. As soon as the voltage value once again falls below the specific limit value, the first LED chain K1 is decoupled again from the supply source 12, for example by the closing of the switch SW1 and bridging of the first LED chain K1.

Figure 2B:
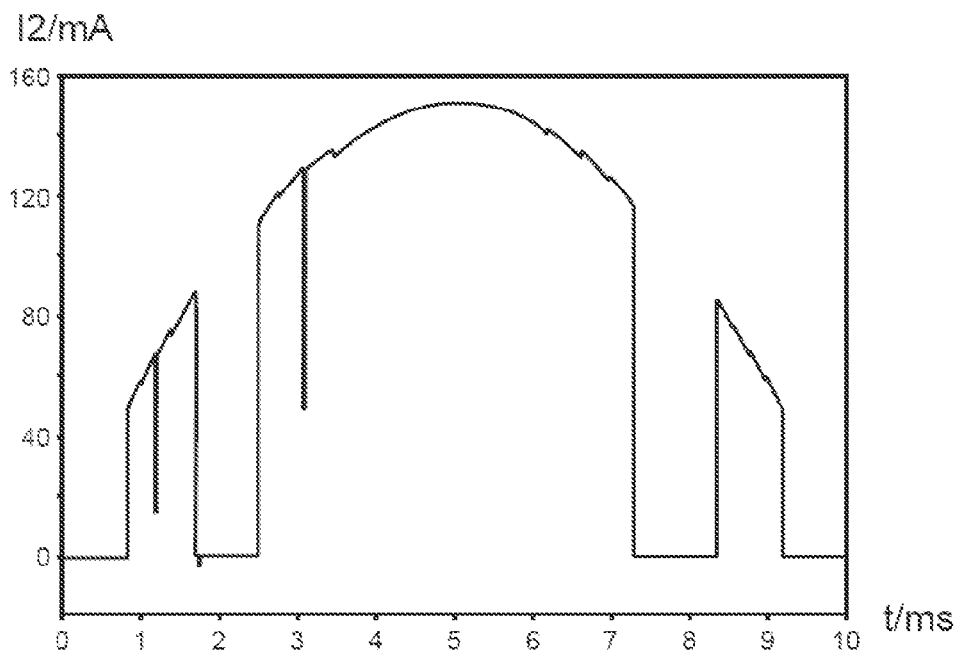
FIG. 2b shows a graphical illustration of the temporal current profile of a second LED chain of an LED arrangement in the case of coupling to and decoupling from a sinusoidal rectified AC voltage by means of a circuit arrangement designed therefor in accordance with various embodiments.
Figure 2C:
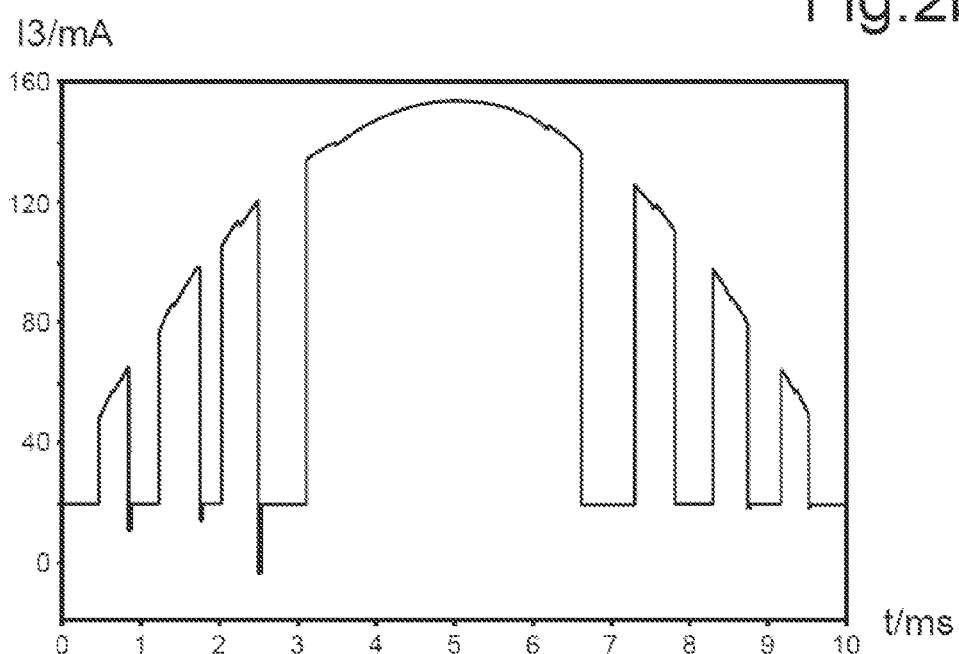
FIG. 2c shows a graphical illustration of the temporal current profile of a third LED chain of an LED arrangement in the case of coupling to and decoupling from a sinusoidal rectified AC voltage by means of a circuit arrangement designed therefor in accordance with various embodiments.

FIG. 2b shows the temporal current profile I2 of the second LED chain K2. Since the second LED chain K2 has fewer LEDs 11 than the first LED chain K1, a smaller voltage already suffices for the operation of the LEDs 11 of the second LED chain K2. Consequently, the latter can already be coupled to the supply source 12 earlier, with respect to the zero crossing of the power supply system sine, at a smaller voltage limit value. When the voltage value of the rectified power supply system sine then reaches the limit value of the first LED chain K1, the latter is coupled to the supply source 12. At the same time, the second LED chain K2 is decoupled from the supply source 12 and is coupled to the supply source 12 again only at a further limit value, achieved at approximately 2.5 ms. In this case, said further limit value is dimensioned such that the voltage provided at said limit value suffices for the simultaneous operation of the LEDs 11 of the first and second LED chains K1 and K2. If said further limit value is undershot again at approximately 7.3 ms, then firstly the second LED chain K2 is decoupled again from the supply source 12. If the limit value for the first LED chain K1 is then also undershot at approximately 8.3 ms, the first LED chain K1 is decoupled from the supply source 12. However, since this voltage at approximately 8.3 ms suffices for the operation of the number of LEDs 11 of the second LED chain K2, the latter is coupled again to the supply source 12 at this point in time and it is only when the limit value for the second LED chain K2 is undershot at approximately 9.2 ms that said second LED chain is decoupled again from the supply source 12. This principle for coupling and decoupling the individual LED chains K1 and K2 can then be continued with a third and fourth LED chain K3 and K4 in an analogous manner FIG. 2c shows the temporal current profile I3 of the third LED chain K3. The latter can in turn be coupled to the supply source 12 at an earlier point in time than the second LED chain K2, that is to say at an even smaller voltage limit value. If the voltage then at approximately 0.8 ms suffices for operating the second LED chain K2, the third LED chain K3 is decoupled again from the supply source 12. If at approximately 1.2 ms the voltage then suffices for simultaneously operating the second and third LED chains K2 and K3, the third LED chain K3 is again coupled to the supply source 12, etc.

Figure 2D:
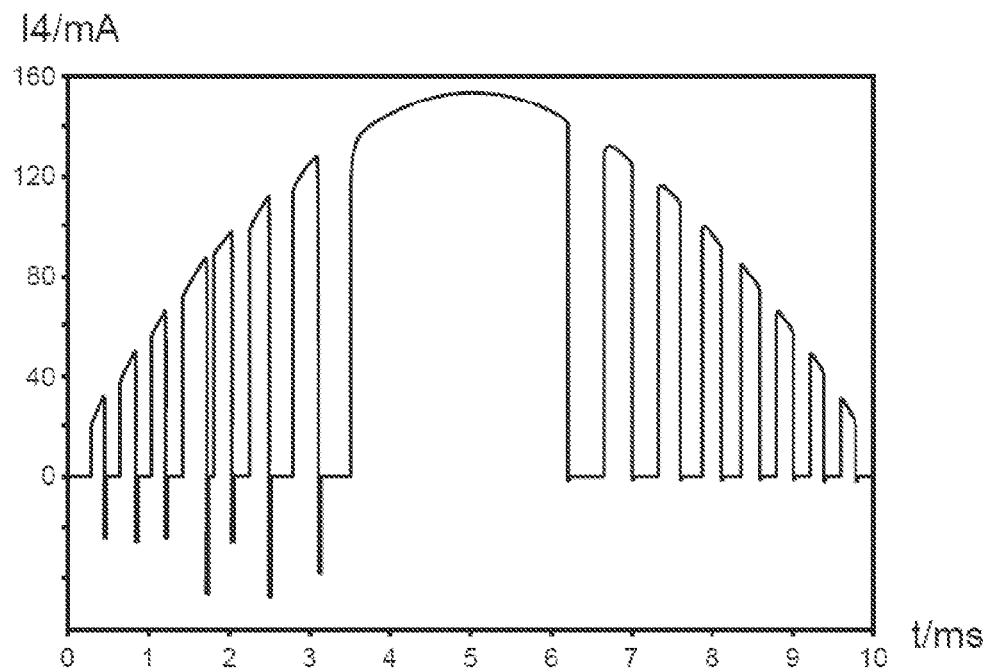
FIG. 2d shows a graphical illustration of the temporal current profile of a fourth LED chain of an LED arrangement in the case of coupling to and decoupling from a sinusoidal rectified AC voltage by means of a circuit arrangement designed therefor in accordance with various embodiments.

FIG. 2d analogously shows the temporal current profile I4 of the fourth LED chain K4. Furthermore, even further, that is to say more than four LED chains K1, K2, K3 and K4 can also be provided. As a result of this progressive coupling and decoupling of the individual LED chains K1, K2, K3 and K4, adapted to the voltage level of the supply source 12, the LEDs 11 can be operated particularly energy-efficiently since it is possible to utilize the voltage provided by the supply source 12 for the majority of its period duration.

Figure 3:
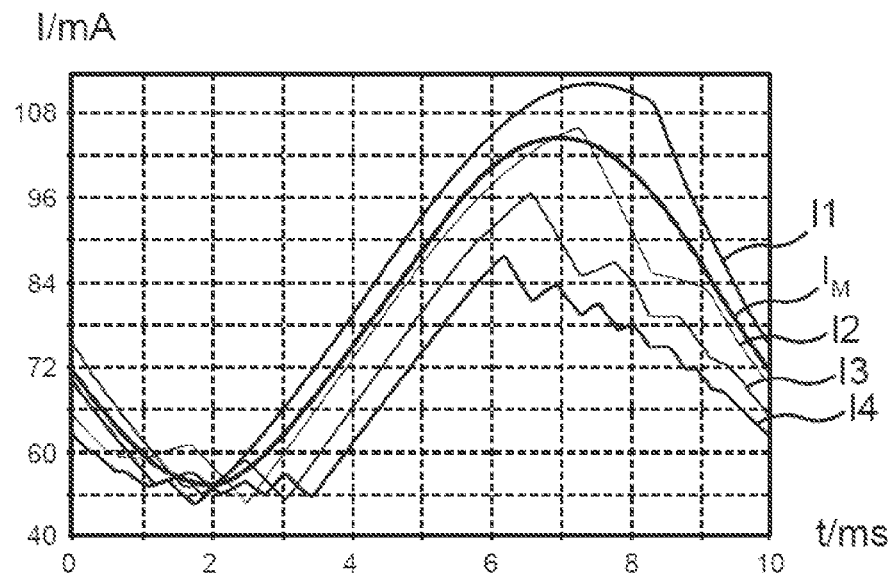
FIG. 3 shows a graphical illustration of temporal current profiles, smoothed by capacitors, through four LED chains of an LED arrangement which are connected and disconnected depending on the voltage level of the power supply system sine in accordance with various embodiments.

FIG. 3 shows a further example of a graphical illustration of temporal current profiles I1, I2, I3 and I4 through four LED chains K1, K2, K3 and K4 of an LED arrangement 20 which are connected and disconnected depending on the voltage level of the power supply system sine, in accordance with various embodiments. In this case, said current profiles I1, I2, I3 and I4 show a smoothed profile brought about by capacitors which, for example, can be connected in parallel with the individual LED chains K1, K2, K3 and K4.

In this case, the LED arrangement 20 may include a circuit arrangement 10 for coupling and decoupling the four LED chains K1, K2, K3 and K4 to and from a supply source 12. The four LED chains K1, K2, K3 and K4 in this example once again each have a different number of LEDs 11. In various embodiments, the first LED chain K1 includes 48 LEDs 11, the second LED chain K2 includes 24 LEDs 11, the third LED chain K3 includes 12 LEDs 11 and the fourth LED chain K4 includes 6 LEDs 11. In this case, too, the individual LED chains K1, K2, K3 and K4 are connected and disconnected depending on the voltage level of the rectified sinusoidal input voltage, as explained in the previous examples. Owing to the different points in time for coupling and in particular also owing to the different coupling durations and owing to the different capacitances of the capacitors connected in parallel with the individual LED chains K1, K2, K3 and K4, the individual LED chains K1, K2, K3 and K4 each have different average current intensities $\bar{I}1$, $\bar{I}2$, $\bar{I}3$ and $\bar{I}4$. In various embodiments, the first LED chain K1 has an average current intensity $\bar{I}1$ of 84 mA, the second LED chain K2 has an average current intensity $\bar{I}2$ of 81 mA, the third LED chain K3 has an average current intensity $\bar{I}3$ of 73 mA and the fourth LED chain K4 has an average current intensity $\bar{I}4$ of 67 mA. In this case, these values should likewise be understood merely as examples and can, of course, vary depending on the LEDs 11 used, the number of LEDs 11 in a respective LED chain, the number of LED chains and the configuration of the circuit arrangement 10 for coupling to the supply source 12, and also the voltage provided by the supply source 12.

Figure 8:
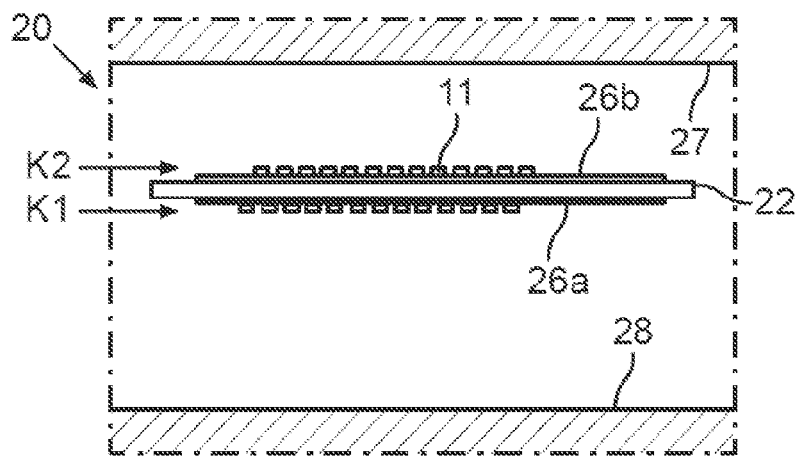
FIG. 8 shows a schematic illustration of an LED arrangement including two LED chains arranged linearly on a planar main body, wherein a first LED chain is arranged on a first arrangement surface situated opposite a second arrangement surface, on which the second LED chain is arranged, in accordance with various embodiments.

In order that these different average current intensities $\bar{I}1$, $\bar{I}2$, $\bar{I}3$ and $\bar{I}4$ do not adversely affect the appearance of the LED arrangement 20, various embodiments provide for taking account of these differences in the case of the arrangement of the LEDs 11 on one or a plurality of arrangement surfaces 26a and/or 26b (cf. FIG. 8). In this case, this arrangement is effected according to a predetermined criterion, which can relate, for example, to a mixture of the LEDs 11 of the individual LED chains K1, K2, K3 and K4 and/or else a separation of the LEDs 11 of the individual LED chains K1, K2, K3 and K4 depending on their average current intensities $\bar{I}1$, $\bar{I}2$, $\bar{I}3$ and $\bar{I}4$. A very high homogeneity of the luminance over the entire LED arrangement 20 can be achieved by means of a mixture of the LEDs 11, while a homogeneous luminance in respective arrangement regions is provided by means of the separation of the LEDs 11, wherein the luminances differ from one another in the individual regions and, by means of suitable arrangement of these regions with respect to one another or by means of a suitable geometrical configuration of the arrangement surfaces 26a and 26b, it is possible to utilize these differences in a targeted manner for producing a desired illuminance distribution.

The mixture of the LEDs 11 of the individual LED chains K1, K2, K3 and K4 will now be explained in greater detail below on the basis of particularly advantageous arrangement possibilities in the case of a linear LED arrangement 20. In FIG. 3, in addition to the current profiles I1, I2, I3 and I4 of the individual LED chains K1, K2, K3 and K4 the average current intensity $I_M$ of all the LED chains K1, K2, K3 and K4 is also illustrated, that is to say $I_M=(48 \cdot \bar{I}1+24 \cdot \bar{I}2+12 \cdot \bar{I}3+6 \cdot \bar{I}4):(48+24+12+6)$ with an average value of $\bar{I}_M=80.6$ mA. In order, in the case of a linear arrangement of the LEDs 11, then to obtain a homogeneous luminance over the complete length of the LED arrangement 20, it is necessary for the LEDs 11 to be distributed correspondingly expediently. This is the case if, in individual length sections of the linear arrangement, the deviations of the average luminances in said sections from the average luminance of the entire arrangement are minimal or at least as small as possible. In order to achieve a best possible homogeneity, the LEDs 11 can be arranged for example according to a scheme as illustrated in FIG. 4a and FIG. 4b.

Figures 4A, 4B:
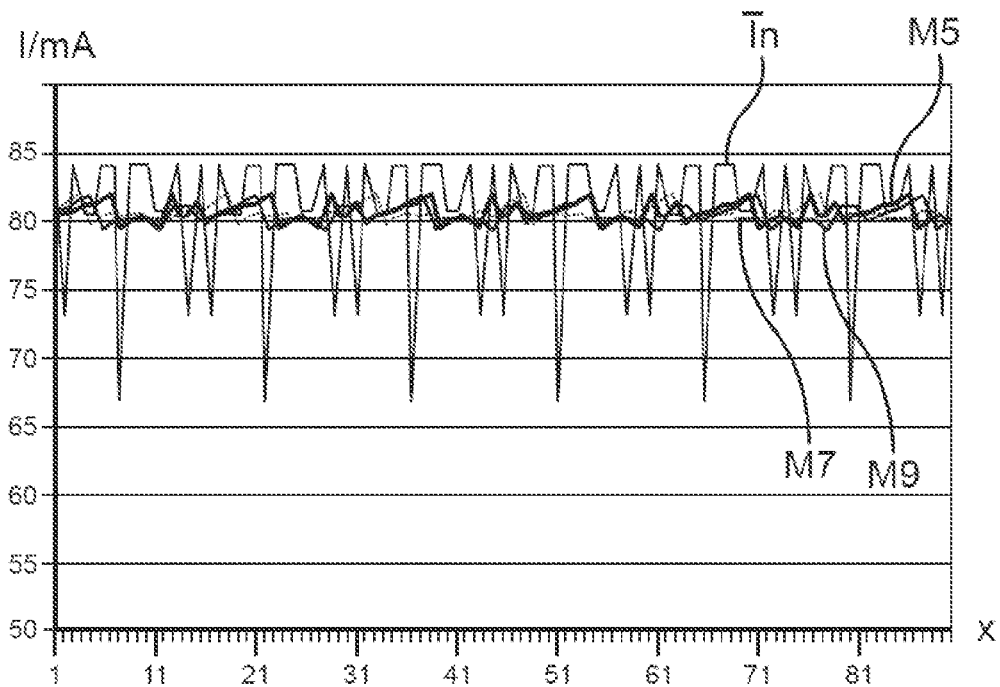

FIG. 4a shows a tabular illustration of a first arrangement possibility for a linear LED arrangement 20 including four LED chains K1, K2, K3 and K4 for generating a homogeneous luminance in accordance with various embodiments. In this case, the first column of the table indicates the position index x of an LED 11 of the linear arrangement, i.e. at what location an LED 11 is arranged in the linear arrangement. The second column designates the LED chain number n of the four LED chains K1 to K4, that is to say n=1, ..., 4. The third column indicates the average current intensity $\bar{I}n$ of the LED chain Kn having the chain number n. The LEDs 11 are therefore arranged as follows according to the table: an LED 11 of the first LED chain K1 is arranged at the first location, an LED 11 of the third LED chain K3 is arranged at the second location, an LED 11 of the first LED chain K1 is arranged at the third location, an LED 11 of the second LED chain K2 is arranged at the fourth location, etc. The fourth column furthermore indicates the average value of the current intensity M5 over five LEDs 11 arranged alongside one another. In other words, for example at the location x=6, this value results from the sum of the average current intensities $\bar{I}n$ at the locations 4, 5, 6, 7 and 8, divided by 5. The fifth and sixth columns respectively indicate the average values of the current intensities M7 and M9 over 7 and respectively 9 neighboring LEDs 11. Assuming that the current intensity In through an LED 11, and e.g. also the average current intensity $\bar{I}n$, is substantially proportional to the luminous flux of the LED 11, it is evident from the table that this LED arrangement 20 exhibits a high homogeneity of the luminance over the entire arrangement since the average values of the current intensities M5, M7 and M9 over 5, 7 and respectively 9 LEDs 11 for all regions under consideration deviate only slightly from the average value of the average current intensity $\bar{I}_M$=80.6 mA of all the LED chains K1, K2, K3 and K4. The position index x is illustrated only up to position 15 in the table, but this arrangement continues periodically, i.e. position 16 corresponds to position 1, position 17 corresponds to position 2, etc.

The arrangement of the total of 90 LEDs 11 according to the scheme illustrated in the table is illustrated graphically again in FIG. 4b. In this case, the x-axis corresponds to the position index x and the y-axis corresponds to the current intensity. In this case, firstly, the average current intensities $\bar{I}1$, $\bar{I}2$, $\bar{I}3$ and $\bar{I}4$ of the respective LED chain K1, K2, K3 and K4 from which an LED 11 is arranged at the position x are plotted in the graphical diagram. Secondly, in each case the average values of the current intensities M5, M7 and M9 over 5, 7 and 9 LEDs 11 are also plotted at the positions x. Therefore, the columns 3, 4, 5 and 6 of the table from FIG. 4a are plotted against the first column of the table from FIG. 4a. From this graphical plotting, too, it is readily apparent that the average values of the current intensities M5, M7 and M9 over 5, 7 and respectively 9 LEDs 11 for all regions under consideration deviate only slightly from the average value of the average current intensity $\bar{I}_M$=80.6 mA of all the LED chains K1, K2, K3 and K4 and an LED arrangement 20 having a very high homogeneity of the luminance across the entire arrangement is thus provided.

Figures 5A, 5B:
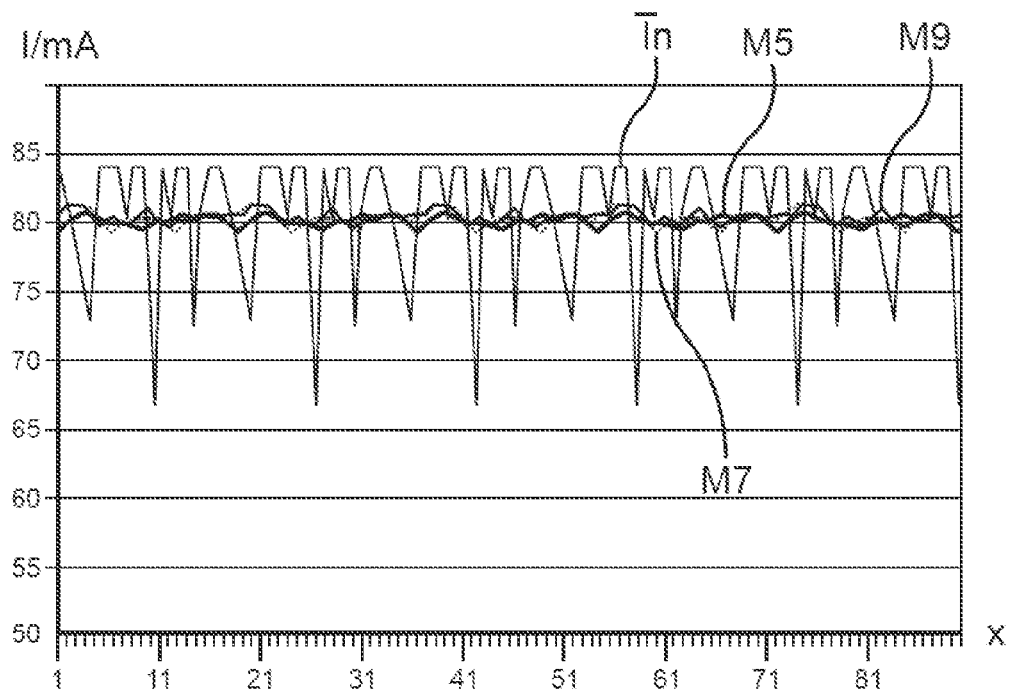

FIG. 5a shows, analogously to FIG. 4a, a tabular illustration of a second arrangement possibility for a linear LED arrangement 20 including four LED chains K1, K2, K3 and K4 for generating a homogeneous luminance in accordance with various embodiments. In this case, once again the first column of the table indicates the position index x of a respective LED 11, the second column indicates the chain number n of the LED chain Kn, from which the LED 11 originates, the third column indicates the average current intensity $\bar{I}n$ of the respective LED chain Kn and the columns 4 to 6 in each case indicate the average values of the current intensities M5, M7 and M9 over 5, 7 and respectively 9 neighboring LEDs 11.

FIG. 5b shows a graphical illustration of the values of the second arrangement possibility illustrated in a tabular fashion in FIG. 5a, likewise analogously to FIG. 4b. In this example, too, it is evident both from the table in FIG. 5a and from the graphical plotting in FIG. 5b that this mixture of the LEDs 11 has the effect that the average values of the current intensities M5, M7 and M9 over 5, 7 and respectively 9 LEDs 11 for all regions under consideration deviate only slightly from the average value of the average current intensity $\bar{I}_M$=80.6 mA of all the LED chains K1, K2, K3 and K4 and, consequently, this arrangement possibility also provides an LED arrangement 20 having a very high homogeneity of the luminance across the entire arrangement.

The arrangements in accordance with FIG. 4a, FIG. 4b, FIG. 5a and FIG. 5b are configured here such that the total number of positions x, 90 in these examples, can be subdivided into subregions, e.g. into exactly the same number of subregions as the number of LEDs 11 in the LED chain K4 having the smallest number of LEDs, such that an LED 11 of the LED chain K4 having the smallest number of LEDs 11 is arranged in each of said subregions. Furthermore, the LEDs 11 of the other LED chains K1, K2 and K3 are likewise divided among said subregions numerically uniformly or at least as uniformly as possible, such that the same number of LEDs 11 of the first LED chain, of the second LED chain, of the third LED chain, etc. is arranged in each subregion. Furthermore, it may be advantageous with regard to the highest possible homogeneity of the luminance if the LEDs 11 are arranged periodically, such that a subregion represents a periodicity interval.

Figures 6, 7A:
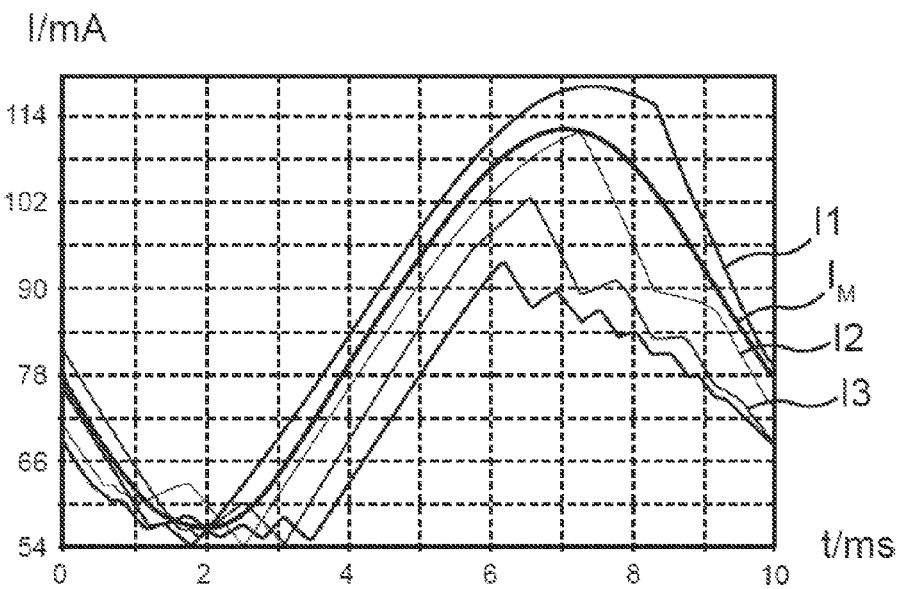
FIG. 6 shows a graphical illustration of temporal current profiles, smoothed by capacitors, through three LED chains of an LED arrangement which are connected and disconnected depending on the voltage level of the power supply system sine in accordance with various embodiments.
FIG. 7a shows a tabular illustration of an arrangement possibility of a linear LED arrangement including three LED chains for generating a homogeneous luminance in accordance with various embodiments.

FIG. 6 shows analogously to FIG. 3 a graphical illustration of temporal current profiles I1, I2 and I3, smoothed by capacitors, but in this exemplary embodiment only through three LED chains K1, K2 and K3 of an LED arrangement 20, which are likewise connected and disconnected depending on the voltage level of the power supply system sine. In this case, the LED arrangement 20 may include for example a total of 84 LEDs 11, wherein the first LED chain K1 includes 48 LEDs 11, the second LED chain K2 includes 24 LEDs 11 and the third LED chain K3 includes 12 LEDs 11. In this case, the average current intensity $\bar{I}1$ of the current through the first LED chain K1 is 84 mA, the average current intensity $\bar{I}2$ through the second LED chain K2 is 82 mA and the average current intensity $\bar{I}3$ through the third LED chain K3 is 74 mA. Furthermore, here as well the average current intensity $\bar{I}_M$ of all the LED chains K1, K2 and K3 is also illustrated, which has an average value of $\bar{I}_M$=82 mA. A suitable arrangement possibility for the LEDs 11 of these three LED chains K1, K2 and K3, e.g. as a linear arrangement, which makes it possible to achieve a particularly high homogeneity of the luminance of the entire arrangement, is illustrated in FIG. 7a and FIG. 7b.

Figure 7B:
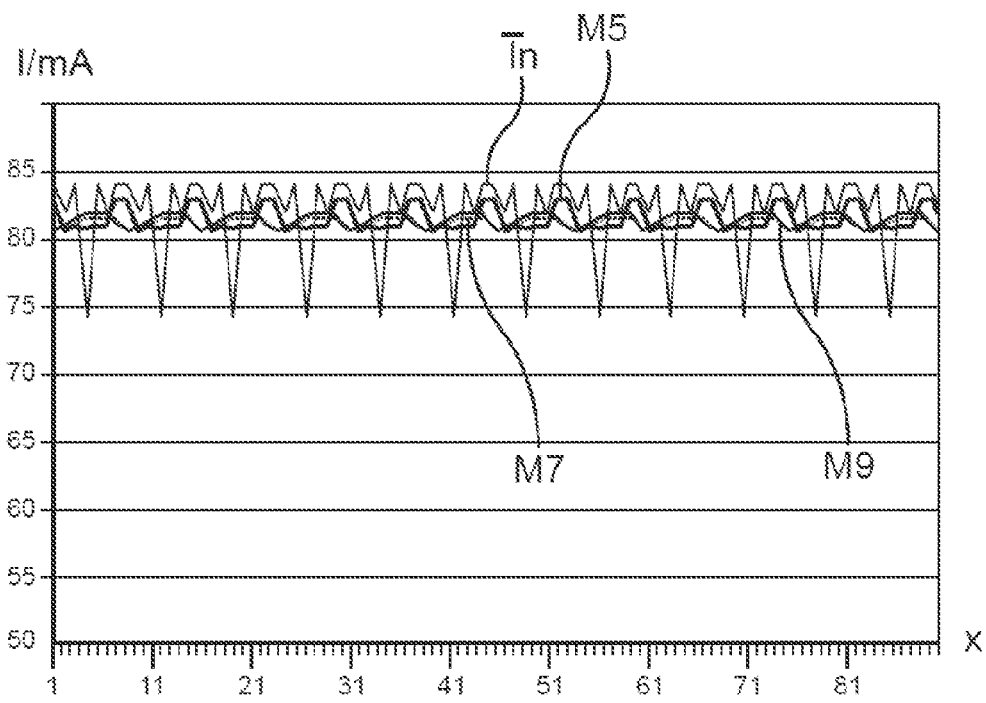

In this case, FIG. 7a shows a tabular illustration of this arrangement possibility, e.g. analogously to the tables from FIG. 4a and FIG. 5a, and FIG. 7b shows the graphical illustration of the values of this arrangement possibility illustrated in a tabular fashion in FIG. 7a. It is evident from these illustrations, too, that this mixture of the LEDs 11 has the effect that the average values of the current intensities M5, M7 and M9 over 5, 7 and respectively 9 LEDs 11 for all regions under consideration deviate only slightly from the average value of the average current intensity $\bar{I}_M$=82 mA of all the LED chains K1, K2 and K3 and, consequently, this arrangement possibility also provides an LED arrangement 20 having a very high homogeneity of the luminance across the entire arrangement.

FIG. 8 shows a schematic illustration of an LED arrangement 20 including LEDs 11 of two LED chains K1 and K2, said LEDs being arranged linearly on a planar main body 22. In this case, the two arrangement surfaces 26a and 26b on which the LEDs 11 are arranged are likewise embodied as planar surfaces and are arranged at the two opposite sides of the main body 22, such that the main emission direction of the LEDs 11 of the first LED chain K1 is opposite to that of the LEDs 11 of the second LED chain K2. Furthermore, the arrangement surfaces can be formed by surfaces of LED circuit boards on which the LEDs 11 are arranged.

In this case, the LED arrangement 20 may include a circuit arrangement 10, by means of which the first and second LED chains K1 and K2 can be coupled to a supply source 12, e.g. to a sinusoidal AC voltage source. Furthermore, the circuit arrangement 10 is configured in such a way that the first LED chain K1 and the second LED chain K2 can be coupled to the supply source 12 at different points in time in order to be able to operate the LEDs 11 as effectively as possible. In various embodiments, the circuit arrangement 10 here can likewise be designed also to interconnect a plurality of LED chains and to connect and disconnect them in each case depending on a voltage level of the power supply system sine. Furthermore, the LED chains K1 and K2 can have a different number of LEDs 11. Owing to the different coupling durations and points in time of the respective LED chain K1 and K2, the LED chains K1 and K2 have different average current intensities $\bar{I}1$ and $\bar{I}2$ and accordingly also different luminances. This effect can now be utilized very deliberately to bring about a desired lighting distribution, for example. In this example, the LED arrangement 20 can be arranged in a room in such a way that the LEDs 11 of the LED chain K2 having the lower average current intensity $\bar{I}2$ face a ceiling 27 of the room in terms of their main emission direction and the LEDs 11 of the LED chain K1 having the higher average current intensity $\bar{I}1$ face a working plane 28 in terms of their main emission direction. In this regard, the LED chain K1 having the higher power can be used for the direct lighting of the working plane 28 and the LED chain K2 having the lower power can be used for generating indirect lighting. As a result of the sorting or separation of LED chains K1 and K2 according to capacity utilization and lumen output and a corresponding arrangement on the main body 22, the circuit-governed effect of the different current intensities $\bar{I}1$ and $\bar{I}2$ of the individual LED chains K1 and K2 can be utilized in a very advantageous manner. In various embodiments, the inhomogeneity of the luminances of individual regions of the LED arrangement 20, such as here e.g. of the two arrangement surfaces 26a and 26b, can be utilized for different lighting purposes, such as e.g. for direct and indirect lighting. In this case, it is also possible to provide more than the two LED chains K1 and K2, each having different average current intensities during operation. In this case, the arrangement surfaces 26a and 26b, on which the LEDs 11 of said LED chains K1 and K2 are arranged, can be configured such that the LEDs 11 of a respective LED chain K1 and K2 emit into a respective solid angle range, such that for example different solid angle ranges can be illuminated in each case to different extents.

Figure 9:
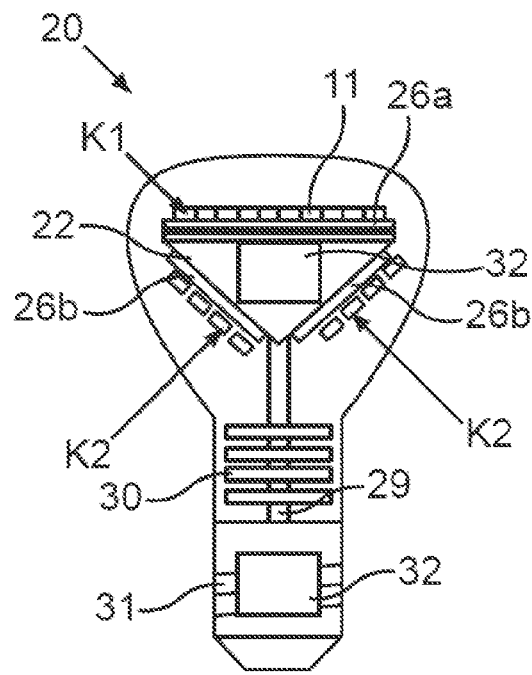
FIG. 9 shows a schematic illustration of an LED arrangement embodied as an LED lamp and including two LED chains, wherein the first LED chain is arranged on a base surface of a main body embodied in a conical fashion and the second LED chain is arranged on the lateral surface of the main body, in accordance with various embodiments.

FIG. 9 shows a schematic illustration of an LED arrangement 20 embodied as an LED lamp and including two LED chains K1 and K2, wherein the first LED chain K1 is arranged on an arrangement surface 26a at a base surface of a main body 22 embodied in a conical fashion, and the second LED chain K2 is arranged on an arrangement surface 26b at the lateral surface of the main body 22, in accordance with various embodiments. In this case, the LED lamp may furthermore include a heat pipe 29, which is linked to the main body 22 and connects the latter to a lamp base 31 via a heat sink 30. An electronic unit 32 can be arranged in the region of the lamp base 31 and of the main body 22, said electronic unit including a circuit arrangement 10, in various embodiments, by means of which the LED chains K1 and K2 can be coupled to and decoupled from a supply source 12. In this example, too, the circuit arrangement 10 is configured in such a way that the individual LED chains K1 and K2 can be coupled and decoupled depending on a voltage level with the supply source 12, such that the individual LED chains K1 and K2 have in particular different coupling durations, coupling points in time and different average current intensities $\bar{I}1$ and $\bar{I}2$ during operation. The resultant different luminances of the individual LED chains K1 and K2 can be utilized particularly advantageously in the case of this LED arrangement 20 as well. By way of example, the LED chain K1 having the higher average current intensity $\bar{I}1$ can be arranged on the arrangement surface 26a arranged at the base side of the conical main body 22. The LED chain K2 having the lower average current intensity $\bar{I}2$ can correspondingly be arranged on the arrangement surface 26b situated on the lateral side of the main body 22. In this regard, here as well the geometrical arrangement of the individual LED chains K1 and K2 depending on the respective average current intensity $\bar{I}1$ and $\bar{I}2$ can be utilized for direct or indirect lighting.

Figure 10:
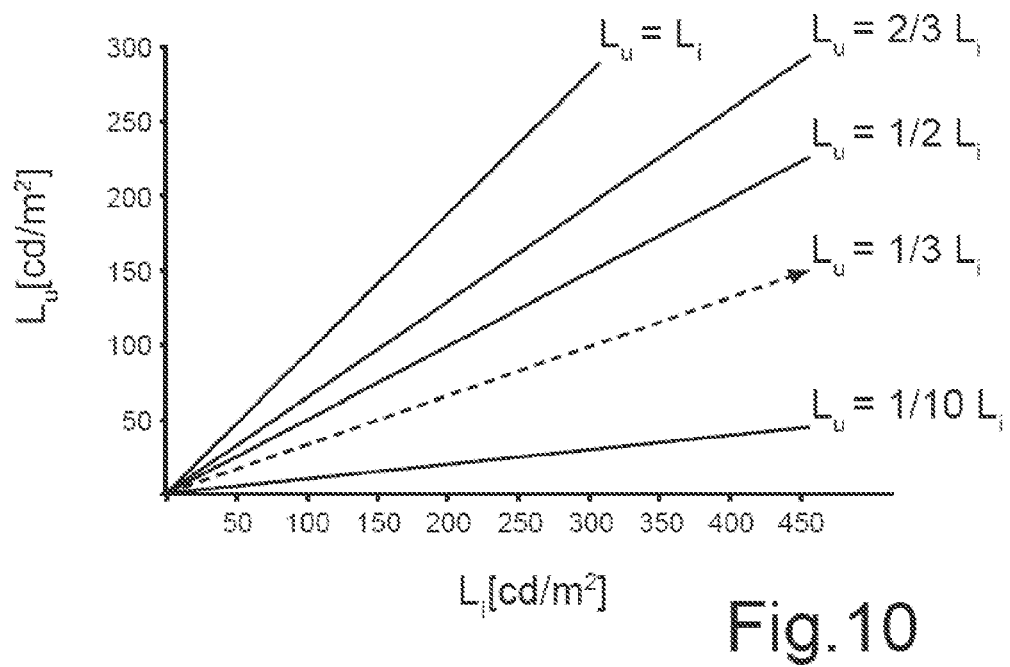
FIG. 10 shows a schematic illustration of the relations of infield and surround luminances for providing the best possible lighting conditions.

A further advantage of the LED arrangements 20 from FIG. 8 and FIG. 9 is, moreover, that it is thus possible to provide direct and indirect lighting that meets the requirements for optimum lighting such as, for example, workplace lighting with regard to infield and surround luminances $L_i$ and $L_u$. A schematic illustration of the relations of infield and surround luminances $L_i$ and $L_u$ for providing the best possible lighting conditions is illustrated here in FIG. 10. In this case, the infield represents the central region of the field of view and the surround represents the peripheral region of the field of view. The luminances of the infield $L_i$, of the surround $L_u$ and e.g. also their ratio to one another in this case have effects on the quality of the perception of objects. Optimum lighting conditions can be produced if the ratio of surround luminance $L_u$ to infield luminance $L_i$ is approximately 1:3. Ratios of 1:2 or 2:3 also constitute a good luminance ratio. In various embodiments, this ratio should be in the range of between 1:1 and 1:10. By contrast, larger and smaller ratios constitute very unfavorable lighting conditions. The arrangements illustrated in FIG. 8 and FIG. 9 can provide direct and indirect lighting that complies with these requirements of the ratios of surround and infield luminances L. and $L_i$ and thus provides for optimum lighting conditions.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light emitting diode arrangement, comprising
at least one first light emitting diode chain having a first plurality of series-connected light emitting diodes;
at least one second light emitting diode chain having a second plurality of series-connected light emitting diodes;
a circuit arrangement for coupling the first and second light emitting diode chains to a supply source, which provides a temporally varying voltage;
wherein the light emitting diodes are arranged at least partly on at least one first arrangement surface;
wherein the circuit arrangement is configured in such a way that the first light emitting diode chain and second light emitting diode chain in each case can be coupled to the supply source and can be decoupled from the supply source,
wherein the first light emitting diode chain can be coupled to the supply source at first points in time and the second light emitting diode chain can be coupled to the supply source at second points in time, wherein the first points in time differ from the second points in time;
wherein the circuit arrangement is configured in such a way that, in the case of a coupling of the light emitting diode arrangement to the supply source, a current having a first average current intensity flows through the first light emitting diode chain and a current having a second average current intensity flows through the second light emitting diode chain, said second average current intensity differing from the first average current intensity at least owing to the difference between the first and second points in time;
wherein the light emitting diodes of the at least one first and second light emitting diode chain are arranged according to a predefined criterion depending on their average current intensities,
wherein the light emitting diode arrangement has at least one second arrangement surface, wherein the at least one first and second arrangement surface are arranged on at least one main body, wherein the normal vectors of the at least one first arrangement surface differ in terms of their direction from the normal vectors of the at least one second arrangement surface, wherein an orientation of the normal vectors points away from the at least one main body, and wherein the separation is configured in such a way that the light emitting diodes of the at least one first light emitting diode chain are arranged on the at least one first arrangement surface and the light emitting diodes of the at least one second light emitting diode chain are arranged on the at least one second arrangement surface.

2. The light emitting diode arrangement of claim 1,
wherein the predefined criterion in the case of the arrangement of the light emitting diodes on the at least one first arrangement surface relates to a mixture of the light emitting diodes of the at least one first and second light emitting diode chain.

3. The light emitting diode arrangement of claim 2,
wherein the mixture is configured in such a way that at least two of the light emitting diodes of the at least one first light emitting diode chain are arranged in each case alongside at least one light emitting diode of the light emitting diodes of the at least one second light emitting diode chain.

4. The light emitting diode arrangement of claim 1,
wherein the light emitting diodes are arranged linearly, such that each light emitting diode has in each case at most two neighboring light emitting diodes.

5. The light emitting diode arrangement of claim 1,
wherein the light emitting diodes are arranged at a respective distance from one another, wherein the distances are dimensioned such that the distances from light emitting diodes having a larger average current intensity to neighboring light emitting diodes are on average greater than the average distances from the light emitting diodes having smaller average current intensities to neighboring light emitting diodes.

6. The light emitting diode arrangement of claim 1,
wherein the predefined criterion relates to a separation of the light emitting diodes of the at least one first and second light emitting diode chain.

7. The light emitting diode arrangement of claim 1,
wherein the first plurality of light emitting diodes differs in terms of its number from the second plurality of light emitting diodes.

8. The light emitting diode arrangement of claim 1,
wherein the first and second arrangement surfaces are arranged with respect to one another in such a way that light which can be emitted by the light emitting diodes arranged on the first arrangement surface can be emitted for the most part into a first solid angle range and light which can be emitted by the light emitting diodes arranged on the second arrangement surface can be emitted for the most part into a second solid angle range, which differs from the first solid angle range.

9. The light emitting diode arrangement of claim 1,
wherein the first and second arrangement surfaces are embodied as planar surfaces and are arranged oppositely on two sides of the at least one main body.

10. The light emitting diode arrangement of claim 1,
wherein the at least one main body is embodied in a conical fashion with a base side and a lateral side and the first arrangement surface is arranged at the base side of the main body and the second arrangement surface is arranged at the lateral side of the main body.

* * * * *